US010657332B2

(12) United States Patent
Zhang et al.

(10) Patent No.: US 10,657,332 B2
(45) Date of Patent: May 19, 2020

(54) LANGUAGE-AGNOSTIC UNDERSTANDING

(71) Applicant: Facebook, Inc., Menlo Park, CA (US)

(72) Inventors: Ying Zhang, Palo Alto, CA (US);
Reshef Shilon, Palo Alto, CA (US);
Jing Zheng, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 173 days.

(21) Appl. No.: 15/850,382

(22) Filed: Dec. 21, 2017

(65) Prior Publication Data
US 2019/0197119 A1   Jun. 27, 2019

(51) Int. Cl.
*G06F 40/49* (2020.01)
*G06F 16/35* (2019.01)
*G06F 40/30* (2020.01)
*G06F 40/44* (2020.01)
*G06F 40/58* (2020.01)
*G06F 40/216* (2020.01)
*G06F 40/284* (2020.01)

(52) U.S. Cl.
CPC .............. *G06F 40/49* (2020.01); *G06F 16/35* (2019.01); *G06F 40/216* (2020.01); *G06F 40/284* (2020.01); *G06F 40/30* (2020.01); *G06F 40/44* (2020.01); *G06F 40/58* (2020.01)

(58) Field of Classification Search
CPC .......................... G06F 17/2785; G06F 17/2845
See application file for complete search history.

(56) References Cited

U.S. PATENT DOCUMENTS

2016/0350288 A1\* 12/2016 Wick .................. G06F 17/2735
2018/0307679 A1\* 10/2018 Duong ................ G06F 17/2827

OTHER PUBLICATIONS

Wick, Michael, Pallika Kanani, and Adam Pocock. "Minimally-constrained multilingual embeddings via artificial code-switching." Thirtieth AAAI Conference on Artificial Intelligence. 2016. (Year: 2016).\*
Dietz, Laura, et al. "TREC Complex Answer Retrieval Overview." TREC. 2017. (Year: 2017).\*
Duong, Long, et al. "Learning crosslingual word embeddings without bilingual corpora." arXiv preprint arXiv:1606.09403 (2016). (Year: 2016).\*

(Continued)

*Primary Examiner* — Brian L Albertalli

(57) ABSTRACT

Exemplary embodiments relate to techniques to classify or detect the intent of content written in a language for which a classifier does not exist. These techniques involve building a code-switching corpus via machine translation, generating a universal embedding for words in the code-switching corpus, training a classifier on the universal embeddings to generate an embedding mapping/table; accessing new content written in a language for which a specific classifier may not exist, and mapping entries in the embedding mapping/table to the universal embeddings. Using these techniques, a classifier can be applied to the universal embedding without needing to be trained on a particular language. Exemplary embodiments may be applied to recognize similarities in two content items, make recommendations, find similar documents, perform deduplication, and perform topic tagging for stories in foreign languages.

17 Claims, 9 Drawing Sheets

(56) References Cited

OTHER PUBLICATIONS

Artetxe, Mikel, Gorka Labaka, and Eneko Agirre. "Learning principled bilingual mappings of word embeddings while preserving monolingual invariance." Proceedings of the 2016 Conference on Empirical Methods in Natural Language Processing. 2016. (Year: 2016).*

Duong, Long, et al. "Multilingual semantic parsing and code-switching." Proceedings of the 21st Conference on Computational Natural Language Learning (CoNLL 2017). 2017. (Year: 2017).*

Schaaf, Thomas, "Detection of OOV words using generalized word models and a semantic class language model," in Proc. of Eurospeech, 2001, 4 pages.

* cited by examiner

LANGUAGE-AGNOSTIC UNDERSTANDING

BACKGROUND

In certain applications, it is helpful to understand the intent of content. For example, a post on a social networking site or bulletin board stating: "I have two chairs to sell, $20 each" could be classified as having an intent of selling something. In another example, if a user reads an article and comments "this is fake," the intent may be to flag the content as inappropriate or misleading. Algorithmically classifying the content in this manner allows automated actions to be performed efficiently (e.g., tagging the post as a "sale," searching for certain intents, moving the post to an appropriate page based on the topic, flagging the post as inappropriate, etc.).

Content may be classified based on its intent by a classifier. Typically, a classifier is trained, using machine learning, from labeled input data. For example, the input data may include text ("I have two chairs to sell") and a corresponding intent label ("for sale"). By exposing the classifier to multiple labeled examples, the classifier begins to learn the intent of new content.

For many organizations interested in performing classification (businesses, academic institutions, governments, etc.), training data is predominantly available in a preferred language. For example, a company based in the United States might have access to a great deal of labeled English-language training examples, but might not have a large number of labeled Mandarin examples. Thus, to classify content in other languages, the content is typically subjected to machine translation to convert it into a language for which a classifier exists, and then the automatically translated result is classified using the classifier.

One problem with this approach is that machine translation systems are typically trained from a relatively small bilingual corpus (e.g., pairs of words or phrases in a source language and a target language). The bilingual training corpus often comes from a single domain (e.g., news stories translated from a first language to a second language may be readily available). Because the corpus comes from a single, or limited number, of domains, a number of problems can arise when attempting to apply a classifier. For example, the translator's vocabulary outside of its preferred domain may be limited, which can cause problems for a classifier that may be looking for target words or phrases.

This problem could be avoided by training a classifier in the original language of the content and applying the classifier directly, without intervening machine translation. However, it is often impractical to train classifiers in every possible language that could be encountered.

DETAILED DESCRIPTION

Figure 1:
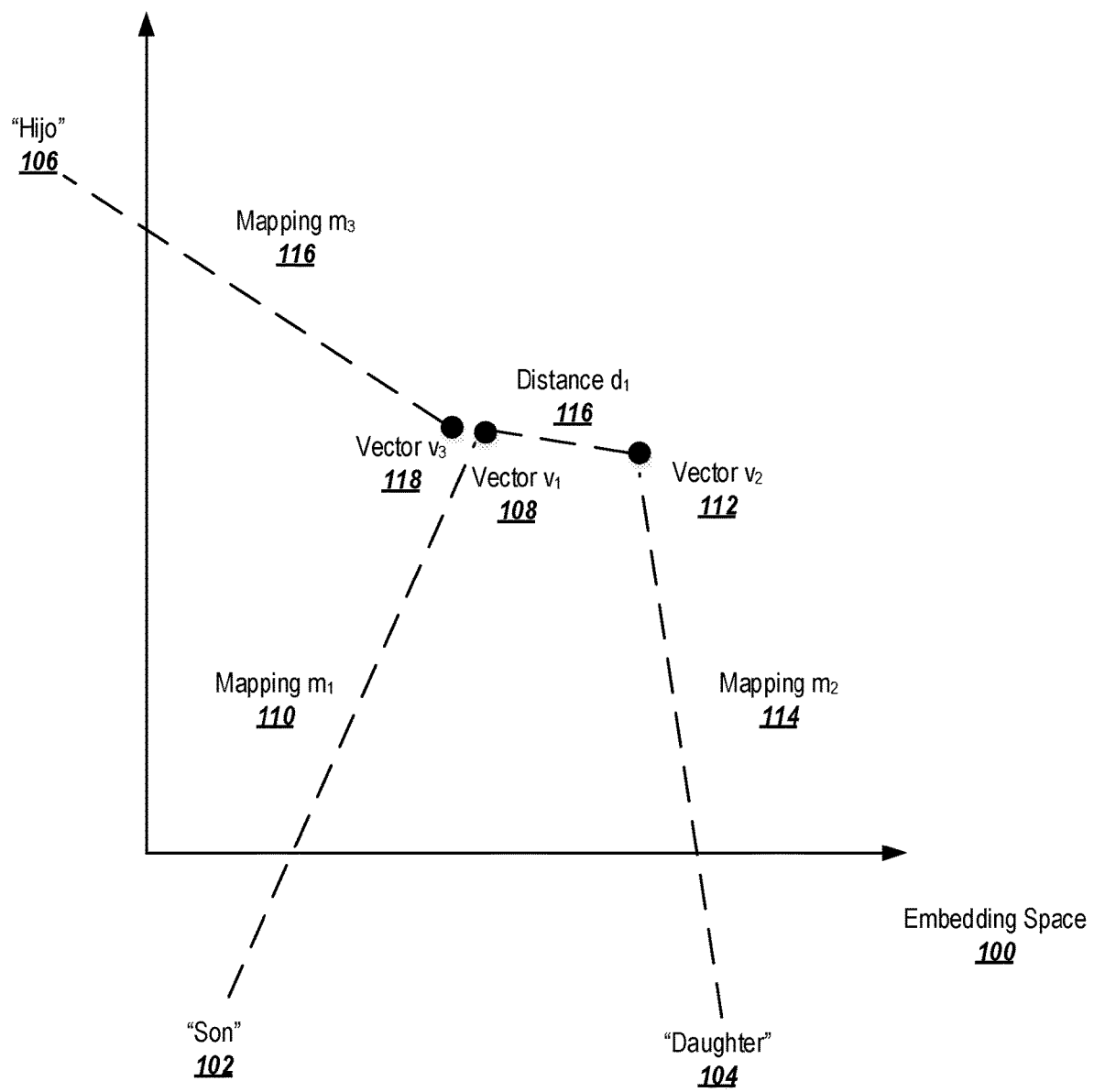
FIG. 1 depicts an embedding space according to an exemplary embodiment.

As noted above, intent classifiers may have difficulty working with machine-translated content (particularly when the machine translator is trained on out-of-domain data).

However, it may be impractical to train separate classifiers for every language that may be encountered.

The present application describes techniques for mapping a word's semantic meaning into a universal word embedding space. Words in different languages with similar semantic meanings map into the same embedding in the embedding space. The embedding space is built using a concatenation of inputs from multiple different languages. Initially, the semantic meanings of similar words in different languages may or may not be connected or overlap in the embedding space. However, synthetically-generated code-switched sentences may be added to the training data to create connections between different languages.

The result is a universal word embedding space that is agnostic as to the language of the input supplied to it. The embedding space may represent an n-dimensional space in which a vector may be defined, the vector representing a unique abstracted semantic meaning to which one or more words in different languages may be mapped. Words appearing in similar contexts may appear near each other in the embedding space. A word/phrase can be looked up in English, Spanish, Chinese, etc., and the semantic meaning of the word/phrase can be approximated based on the universal word embedding to which it is mapped.

A classifier does not necessarily need to understand the full informational content or meaning of a word to classify subject matter in which the word appears. For example, the system may not know the specific definition of the term IPHONE™, nor the difference between an IPHONE™ and a GALAXY NOTE™, but for classification purposes it is sufficient that the terms have similar semantic meanings (both referring to types of cell phones) and thus appear in similar contexts. If the word "IPHONE™" is often used with certain intents (e.g., technology reviews, listings for sale, etc.), then other words mapped to the same embedding as the word "IPHONE™" (as "GALAXY NOTE™" might be) may also be strongly connected with those intents.

A similar assumption holds when words in different languages are mapped to the same embedding space in the above-described universal embedding.

To create the mappings between the semantic meanings of words in different languages in the embedding space, a code-switching dataset may be generated across multiple languages (e.g., all languages of interest). Code-switching refers to the phenomenon in which content primarily in one language (e.g., Spanish) includes one or more words or phrases encoded in another language (e.g., English). For example, in the predominantly Chinese phrase 我喜欢我的 iPhone 套子, the word "iPhone" is encoded in English.

Often, words that appear in similar contexts have similar semantic meanings. Continuing with the above example, if a number of English-language training examples are available that state "I love my IPHONE™ case," then it may be inferred that the Chinese characters "套子" and the English word "case" have similar semantic meanings and can therefore be mapped to the same embedding in the embedding space. This is because both the words "case" and "套子"

often appear in the same context (e.g., after the word "IPHONE™"). By taking a word under consideration and defining the words surrounding the word under consideration as the context, words that appear in similar contexts (and which therefore likely have similar semantic meanings) can be identified. When the words under consideration and the words forming the context include words in different languages, connections between those words in different languages can be made. Thus, code-switched examples can be valuable for determining semantic meaning.

Code-switching examples may be available, e.g. from content generated by bilingual speakers. The available code-switching corpus, however, can be dramatically increased by applying high-confidence machine translations on select words and phrases. The words and phrases may be those which the translation system determines are translatable into another word or phrase with high probability (e.g., above a predetermined threshold).

For example, consider a French sentence made up of three words, $f_1$, $f_2$, and $f_3$. Each of these words may be translated, by a machine translation system, into an English word with high confidence (i.e., $f_1 \rightarrow e_1$, $f_2 \rightarrow e_2$, and $f_3 \rightarrow e_3$). The system may therefore generate the following code-switched sentences:

$e_1$, $f_2$, $f_3$
$e_1$, $e_2$, $f_3$
$f_1$, $e_2$, $f_3$
$f_1$, $e_2$, $e_3$
$f_1$, $f_2$, $e_3$

If only some of the words in the original French sentence can be translated with high confidence, then only those words will be used to generate example sentences in the code-switching corpus.

More generally, exemplary embodiments involve accessing source content C that is written in a first language (e.g., Chinese). The content C is provided to a machine translation system capable of translating at least some of the content C into a second language (e.g., English) with high probability. The translation system may restrict its output so as to only translate the words and phrases that have a high probability of correct translation, thus generating a set of sentences or phrases C_e representing a code-switching data set, including words in the first language and words in the second language. The monolingual source content C may be combined with any available monolingual content in the second language E, as well as the code-switching data C_e. This code-switching generation creates multiple artificial bridge points between two languages, for purposes of determining which words have similar semantic meanings. This process may be repeated for any language of interest, and the resulting concatenated dataset may be used to build the universal word embedding.

Machine learning may be used to train the classifier on available labeled data. Training the classifier may involve mapping words in the labeled data to their respective universal embeddings and creating a mapping or table for these correlations. When it comes time to classify new data (regardless of whether the new data is provided in a language that the classifier was trained on), the classifier can determine the intent of the new data by disregarding the language of the new data and replacing words in the new data with their universal embeddings. The words in the new data may be mapped, via the table/mapping, to their respective universal embeddings.

It is noted that machine translation may be used to build the initial code-switching corpus to train the classifier. However, once the classifier is trained it does not need to rely on translations (machine-generated or otherwise) to classify new input. Input may be provided in any language, mapped to a semantic meaning in the embedding space, and then the semantic meaning can be used to classify the input. This addresses the above-described problem of using machine translators trained with out-of-domain data. Another advantage is that only one classifier in one language needs to be trained; the classifier can rely on the semantic meanings in the embedding space when classifying content from other languages. Thus, it is not necessary to train different classifiers for each language of interest.

In some embodiments, it may be helpful to fine-tune or retrain a word embedding for specified tasks (e.g., a classifier for sports content, political content, hate speech, etc.). When refining the word embedding, a problem arises with respect to languages for which limited training data is available.

For example, consider a situation in which the goal is to develop a universal sentiment analysis classifier for all languages, but annotated training data is available only for English and a few other major languages. For other "low-resource" languages, training data is unavailable or limited.

One possible solution to retrain the embedding space is to fix the universal word embedding of a word, and only train other neural-network parameters on training data in major languages. The hope is that the resulting classifier would automatically work on other languages.

However, it has been found in many cases that using a task-specific embedding often leads to better accuracy. Therefore, if the universal word embedding is refined only on major languages, it may hurt accuracy on low resource languages.

To counter this problem, the loss function used during universal embedding training may be used as a regularization term when fine tuning the universal word embedding for specific tasks. Using this approach, accuracy improvement obtained by fine tuning in major languages is more likely to generalize to low-resource languages. The goal is to maintain a similar distance between similar embeddings for foreign-language words in the refined embedding space. For example, if the embedding for the word "taxi" in English is modified by pushing it in a given direction in the embedding space, the Chinese word for "taxi" should also be pushed in a similar direction and by a similar amount. Exemplary embodiments therefore update related words based on how distant the foreign language words are by using the loss function as a regularization term.

These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Word Embedding Space

FIG. 1 depicts a word embedding space in accordance with an exemplary embodiment of the invention. The word embedding space represents an n-dimensional space in which vectors may be defined which represent an abstracted semantic meaning to which words in different languages may be mapped. It should be realized that while FIG. 1 shows a two-dimensional space, the actual word embedding space may be of any number of dimensions. Typically, the word embedding space and the vectors contained therein have the same number of dimensions.

FIG. 1 shows the English word "son" 102 mapped to vector $V_1$ 108 via mapping $m_1$ 110. Likewise, the English word "daughter" 104 is mapped to vector $V_2$ 112 via mapping $M_2$ 114. The mapping is typically accomplished by feeding the words into a trained classifier (i.e., a neural network) that determines the embeddings. The mapping attempts to minimize the amount of information lost in mapping the words to the vectors.

The proximity of vector $v_1$ 108 and vector $v_2$ 112 indicate that the words mapped to those vectors have similar semantic meanings and often appear in similar contexts. The distance $d_1$ 116 between vector $V_1$ 108 and vector $V_2$ 112 may be used as a measure of the closeness of the semantic meetings and the context in which these words often appear. As an example, words "son" and the word "daughter" have different meetings but would often be used in a similar semantic context, and, as such, the vectors to which they are mapped are close in distance in the word embedding space, but are not the same vector. Thus, words that are related to each other will be mapped to vectors that are relatively close to each other in the word embedding space, while the vectors to which unrelated words are mapped should be further apart. A loss function represents distances between related words. When the loss function is minimized, the optimal configuration for the embedding space is realized.

Because word embedding space represents abstracted semantic meanings of words and phrases, the space is agnostic as to the language of the inputs applied to it. Thus, a word in any language can have its semantic meaning approximated based on the vector to which it is mapped.

Words from different languages with identical semantic meanings may be mapped to the same vector or vectors which are very close to each other in the word embedding space. Words with similar semantic meanings are mapped to vectors that are close to each other. For example, the Spanish word "hijo" 106 (translating to "son" in English) is shown mapped to vector $V_3$ 118 via mapping $M_3$ 116. The proximity of vectors $V_1$ and $V_3$ to which the word "son" 102 and "hijo" 106 are mapped respectively indicates that the semantic context of these words is nearly identical. In one embodiment, to create the mappings between semantic meanings of words in different languages in the embedding space, a code-switching data set may be used. Code-switching data sets may be created by performing machine translations on select words and phrases having a high confidence of being translated correctly, and creating mixed language content based on these translations.

Machine Translation System

Figure 2A:
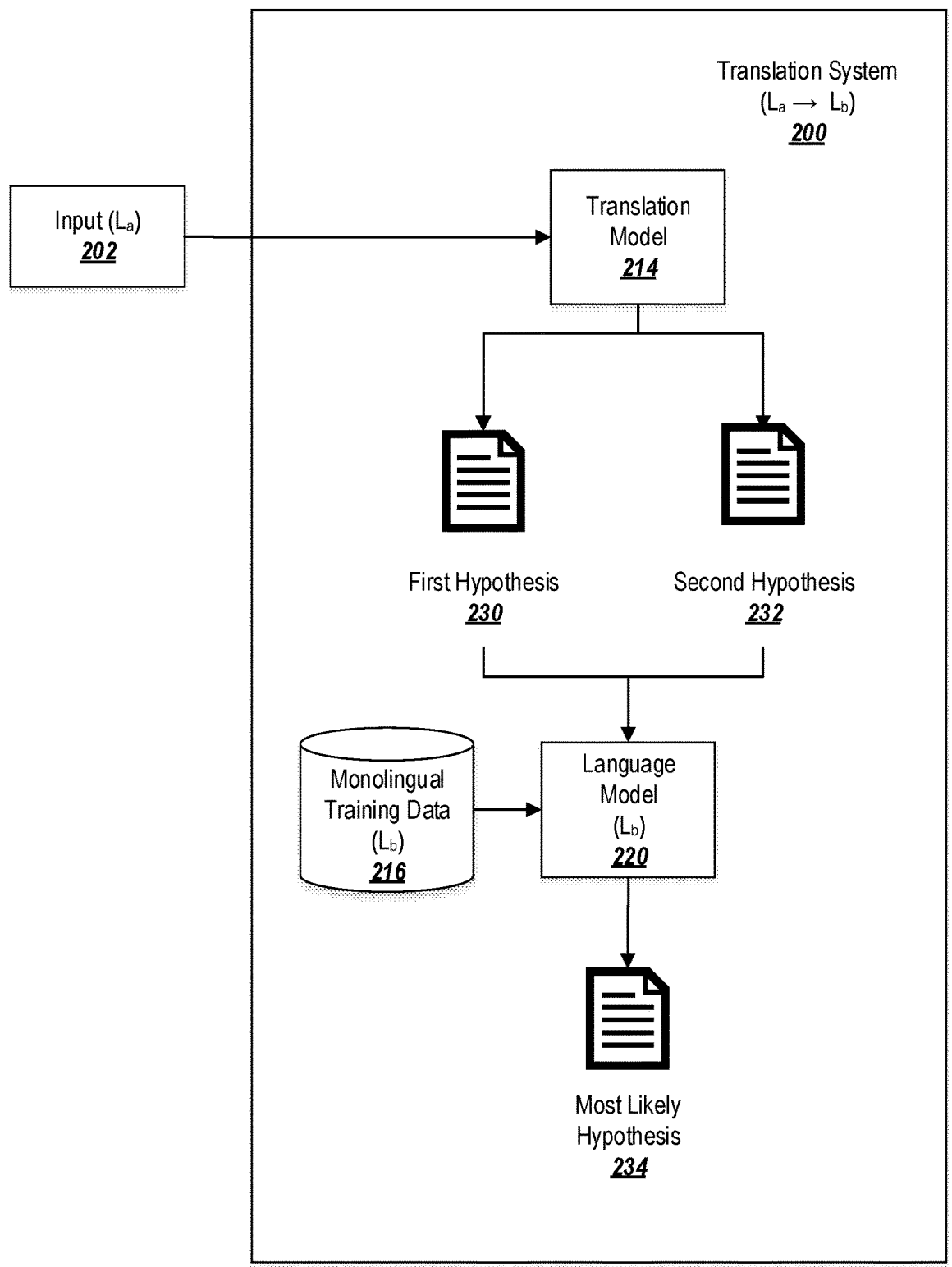
FIGS. 2A-2B depict an exemplary machine translation system according to an exemplary embodiment.

FIG. 2A depicts an exemplary machine translation system 200 for translating source material in a source language $L_a$ into destination language $L_b$. The translation system 200 includes a translation model 214 and a language model 220.

The translation model 214 accepts an input 202 in the source language $L_a$ and generates one or more hypotheses 230, 232 that represent equivalent destination language $L_b$ words or phrases. For example, the translation model 214 may receive the Spanish source-language word "casa" and may be asked to translate this word into English. The translation model 214 may generate a first hypothesis 230 of "house," and a second hypothesis 232 of "home."

The translation model 214 sends the hypotheses to the language model 220, which looks at the hypotheses in the context of the larger translation. For example, if the language model 220 identifies that the word after "casa" is translated as "white," the language model 220 may output "house" as the most likely hypothesis 234.

To identify which hypothesis is most likely, the language model 220 is trained using monolingual destination language ($L_b$) training data 216. Essentially, the language model 220 analyzes a large number of destination language ($L_b$) phrases, sentences, etc., and learns the grammatical and other rules for the destination language ($L_b$). This allows the language model 220 to better identify which of the hypotheses 230, 232 is more likely.

Figure 2B:
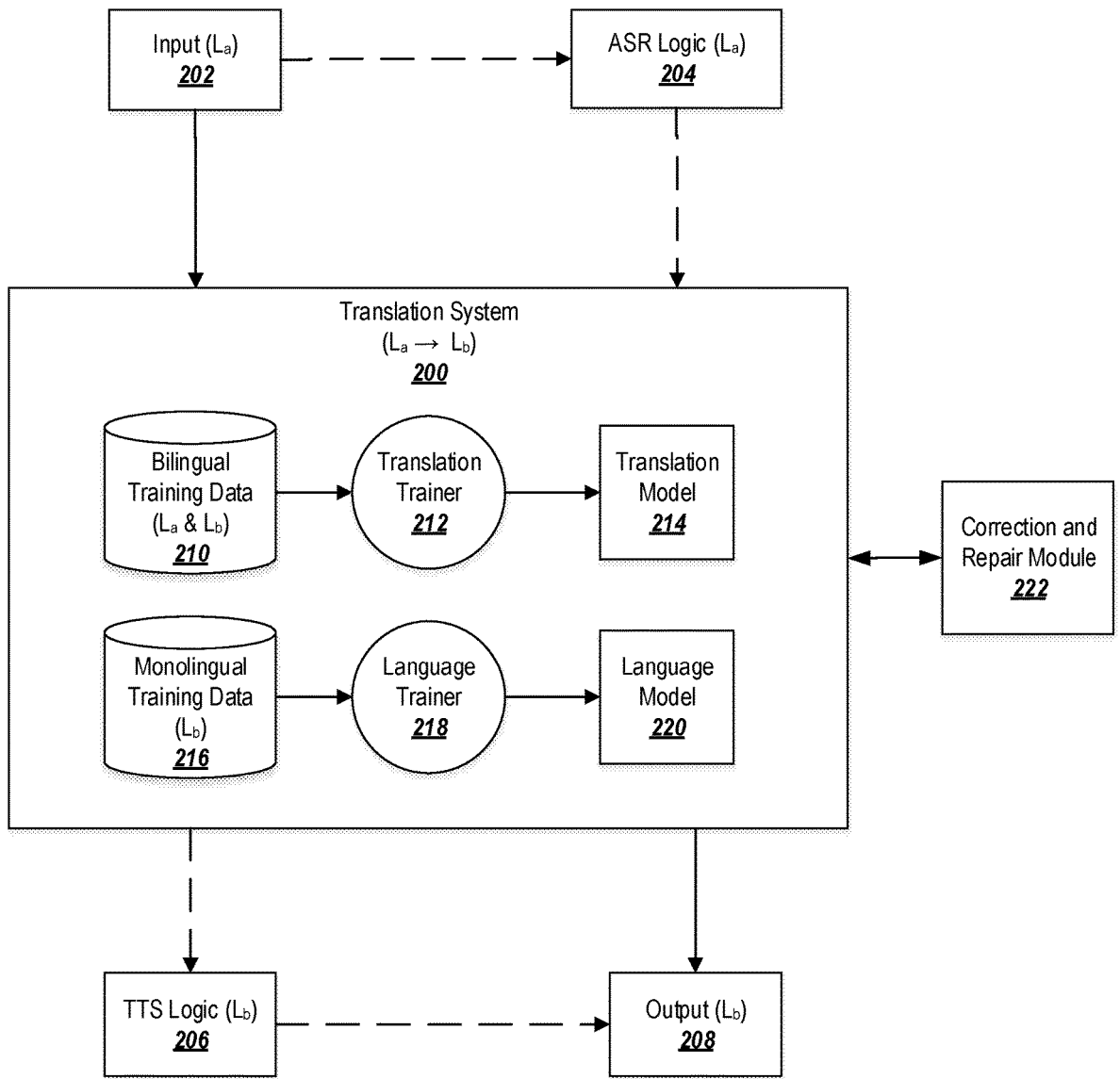

FIG. 2B is a block diagram overview of an example of a translation system suitable for use with exemplary embodiments. FIG. 2B depicts a unidirectional system in which a translation is performed from $L_a$ to $L_b$; however, the present invention is not so limited. The translation system may be bidirectional, performing translation in both directions (from $L_a$ to $L_b$ and from $L_b$ to $L_a$). Moreover, a multi-directional system involving several languages $L_1 \ldots L_n$, could equally benefit from the present invention.

An input 202 may be provided to the machine translation system. The input 202 may be in the form of text in the source language $L_a$, such as text input from a keyboard via a web browser or application. The input 202 may also take other forms, such as an audio recording, writing provided directly to a computing system through a stylus or electronic pen, writing indirectly provided to a computing system (e.g., by scanning a handwritten or typed document), a photograph (e.g., a photograph of a sign), and other suitable types of input. To provide the input 202, a user may interact with the system via a graphical user interface displayed on a computing device screen (or active touch screen), a pointing device such as a mouse or pen, a microphone, and/or a keyboard.

In some embodiments, the translation system 200 is operable to translate textual information from the source language $L_a$ to the destination language $L_b$. Accordingly, to handle multiple different types of inputs 202, logic may be provided for converting the input 202 into text. For example, FIG. 2B depicts automatic speech recognition (ASR) logic 204 that is configured to convert input audio in the source language $L_a$ into text in the source language $L_a$. To convert an audio recording to text, the ASR logic 204 may utilize an acoustic model, an ASR class-based language model, and a recognition lexicon model. One example of suitable ASR logic is the "Ninja" speech recognizer system. Other types of ASR logic that may be used include speech recognizers developed by SRI or BBN.

Other types of logic may be provided for other types of inputs 202 (e.g., optical character recognition logic for converting input handwriting or typing, image analysis logic for converting input photographs, etc.). If the translation system operates on something other than text (e.g., audio), suitable logic may be provided for converting the input 36 into a format recognizable to the translation system.

The input 202 is provided to a translation system 200 (potentially after being processed by the ASR logic 204 or other suitable logic). The translation system 200 is configured to translate the input 202 from the source language $L_a$ into the destination language $L_b$. Examples of translation systems 200 suitable for use with exemplary embodiments include the "PanDoRA" system developed, as well as machine translation systems developed by SRI or BBN.

Generally, the translation system 200 applies a translation model 214 to source language words, phrases, sentences, etc. in the input 202 to develop a list of plausible candidate destination language words, phrases, sentences, etc. that may represent a translation of the source language material. The list of candidate destination language words, phrases, sentences, etc. are referred to as translation hypotheses. After generating a list of hypotheses, the list may be subjected to further analysis by a language model 220. The language model 220 considers the context in which the hypotheses are used in the destination language $L_b$, and selects one of hypotheses as the most likely translation of the source material.

The translation model 214 may be, for example, a phrase table with entries for each hypothesis. Each entry may include a source language word, phrase, sentence, etc. and a paired destination language word, phrase, sentence, etc. Each entry may be associated with a score that represents the likelihood, in general, that the destination language portion of the pair is the translation of the source language portion of the pair. For illustration purposes, an example of a phrase table is shown in Table 1, below.

TABLE 1

| Source Material | Destination Material | Score |
|---|---|---|
| Good | Gut | 0.7 |
| Good | Guten | 0.5 |
| Good | Heiligmäßig | 0.1 |

The source/destination pairs in the phrase table may be generated from bilingual training data 210. The bilingual training data 210 may include words, phrases, sentences, etc. that have been previously translated from the source language $L_a$ to the destination language $L_b$ (or vice versa). The score in the phrase table may represent a frequency at which the source/destination pairs were found to correspond to each other in the bilingual training data 210. A translation trainer 212 includes logic to analyze the bilingual training data 210 and create or modify entries in the phrase table based on the analysis.

As noted above, the translation model 214 produced by the translation trainer 212 may be well-suited to generating an initial list of hypotheses indicative or possible translations for the source material. However, the translation model 214 typically does not take context into account. For example, Table 1 above shows that, in general, the word "Good" was translated into "Gut" slightly more often than it was translated into "Guten". Nonetheless, both are reasonably plausible hypotheses. Thus, without any context, it may be difficult to determine which translation is the most likely. However, assume that the previous word was translated as "Sehr" ("Very"). In German, it is much more likely that the word after "Sehr" should be translated as "Gut," rather than "Guten." To take this information into account, a language model 220 provides one or more tuning scores that allow the initial phrase table score to be supplemented or replaced in view of the words and phrases surrounding a particular candidate hypothesis. When presented with new information for translation, the translation system 200 may generate an initial list of hypotheses using the translation model 214, and then may select the most likely translation from among the list of hypotheses using the tuning scores provided by the language model 220.

For illustration purposes, an example of a table of probabilities applied by a language model 220 is shown in Table 2, below.

TABLE 1

| Hypothesis under Consideration\|Previous Word/Phrase Analyzed | Probability |
|---|---|
| house\|the white | 0.8 |
| home\|the white | 0.01 |

The language model 220 used to translate a source language $L_a$ into a destination language $L_b$ is a language model 220 for the destination language $L_b$. The language model 220 may be trained using monolingual training data 216 for the destination language $L_b$. The monolingual training data 216 may be any suitable list of words, phrases, sentences, etc. from the destination language $L_b$. For example, the monolingual training data 216 may include publications, articles, or literature from the destination language $L_b$, and/or may include text collected from various sources (e.g., social networking posts, assuming that the author's privacy settings allow for the collection of such data). A language trainer 218 may include logic configured to analyze the monolingual training data 216 and to generate one or more tuning scores based on the occurrence of words, phrases, etc. based on their placement with respect to one another.

In some embodiments, a correction and repair module 222 employing correction logic may be provided. The correction and repair module 222 allows the user to correct the translation system 200 output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000.

User field customization logic may provide an interface for users to add new vocabulary to the system, and can also select an appropriate system vocabulary for their current situation. For example, a change in system vocabulary may be triggered by a change in location, as determined by the UPS coordinates indicating the current location of the user's device, or an explicit selection of task or location by the user.

The Correction and Repair Module 222 records and logs any corrections the user may make, which can be later used to update ASR logic 204 and translation system 200. If the correction contains a new vocabulary item, or if the user enters the field customization mode to explicitly add a new word to the system, or if a new word is automatically detected in the input audio using confidence measures or new word models, such as the method described in Thomas Schaaf, "Detection of OOV words using generalized word models and a semantic class language model," in Proc. of Eurospeech, 2001, the new vocabulary item or word may be added to the translation model 214 and/or the language model 220.

After applying the translation model 214 and/or the language model 220 to the input 202, the translation system 200 may generate an output 208 in the destination language $L_b$. The output 208 may be in a textual format and may be presented on a display device. In some embodiments, the output 208 may be automatically presented (e.g., an automatic translation or "autotranslation"). In other embodiments, a prompt may be presented and the user may request that the translation be shown. The translation may remain hidden until the user manually requests that the translation be presented.

If it is desirable to provide the output 208 in a format other than text, then logic may be employed for converting the output 28 into the desired format. For example, FIG. 2 depicts text-to-speech (TTS) logic 206 for converting the text generated by the translation system 200 into an audio recording. The TTS logic 206 generates audio output for an output device, such as a speaker. Examples of suitable TTS logic 206 include the Cepstral TTS module was used. Other TTS modules, such as TTS modules which support Windows SAPI (speech application programming interface) conventions, could also be employed.

Code-Switching Corpuses

Figure 3:
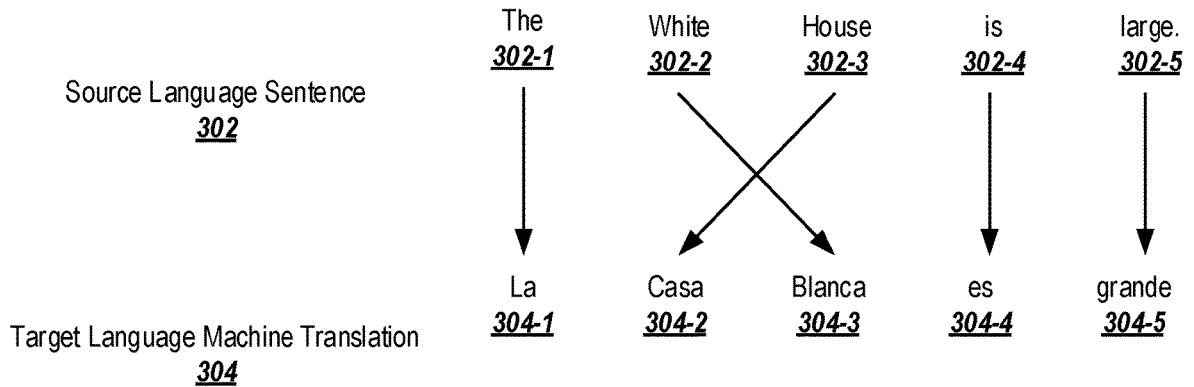
FIG. 3 depicts an example of a code-switching corpus according to an embodiment.

FIG. 3 depicts an example of a code-switching corpus according to an exemplary embodiment. Code-switching refers to the embedding of one or more words or phrases in a second language into a phrase or sentence in a first language to provide semantic context for the one or more words or phrases in the second language. This allows the mapping of those words in the second language to vectors in the word embedding space which are the same as or in close proximity to vectors to which the corresponding words in the first language have been mapped.

In FIG. 3, an example is shown using source language sentence 302 composed of words 302-1 . . . 302-5, in this case "The White House is large." A machine language translation is performed on each word in the sentence, resulting in a target machine language translation 304 comprising individual words 304-1 . . . 304-5, in this case "La Casa Blanca es grande." The machine language translation also provides a translation confidence 306 for each word 306-1 . . . 306-5 which indicates the likelihood that the translation is correct. Only words having a translation confidence 306 above a predefined threshold are used to create the code-switched corpus 308. In the example shown in FIG. 3, only translations 304-2, 304-3, and 304-5, have confidence levels 306-2, 306-3 and 306-5, respectively, high enough (i.e. above the predetermined threshold) to warrant their use in the creation of the code-switched corpus 308. To create the code-switched corpus 308, a plurality of sentences 308-1 . . . 308-6 are created by substituting each combination of words 302-2, 302-3 and 302-5 from source language sentence 302 with words 304-2, 304-3 and 304-5 from the target machine language translation 304 having a translation confidence 306 above the predetermined threshold.

The code-switched corpus 308 may then be used to provide semantic context for words 304-2, 304-3 and 304-5 in the target machine language translation 304 for purposes of mapping to vectors in the word embedding space. This should result in the mapping of words 304-2, 304-3 and 304-5 to vectors in the word embedding space which are the same as or very close to vectors to which words 302-2, 302-3 and 302-5 are mapped respectively. This provides a language-agnostic universal word embedding space based on semantic context.

Task-Specific Embeddings

Figure 4:
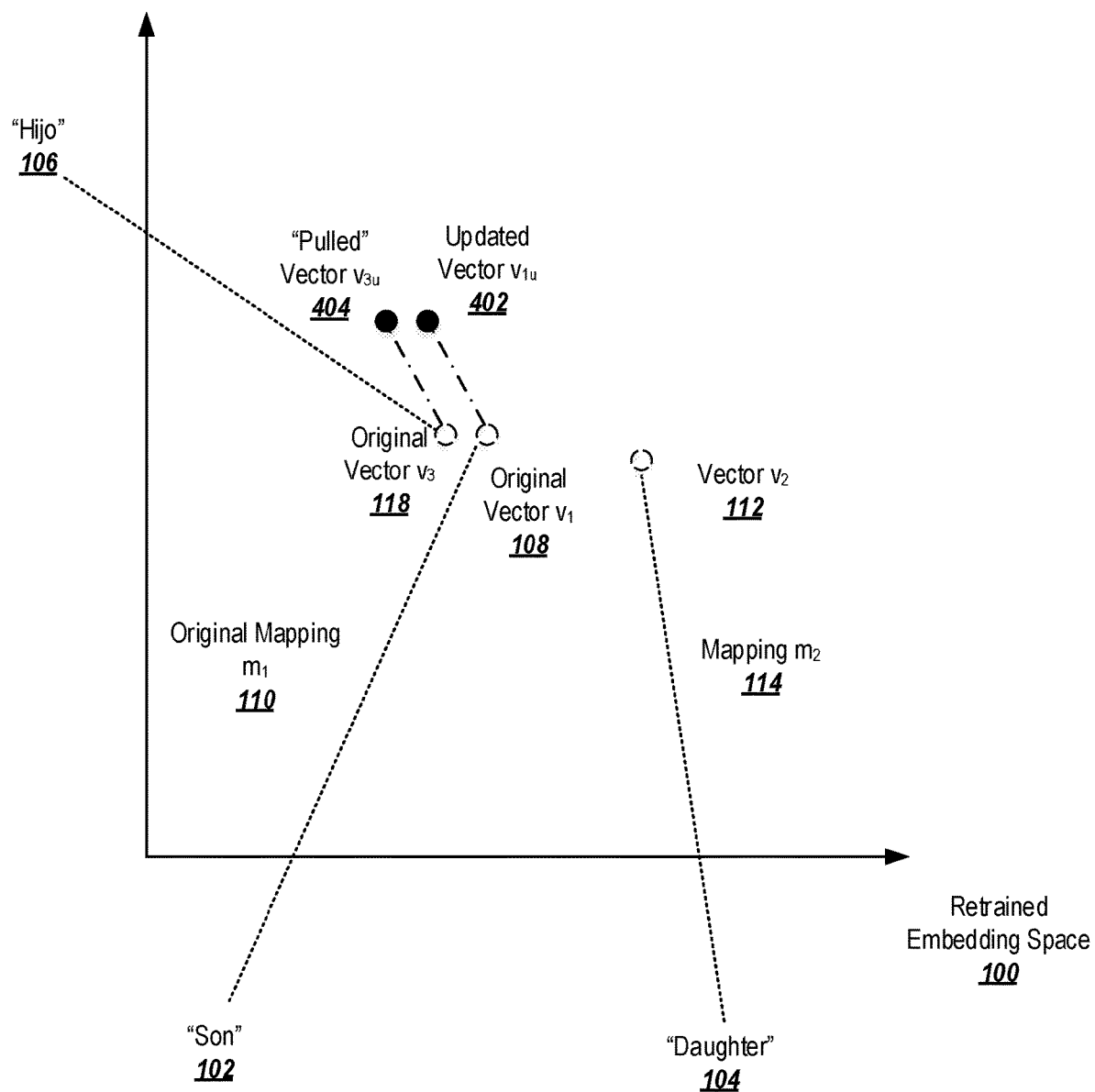
FIG. 4 depicts an embedding space in which one or more embeddings are fine-tuned for a specified task.

FIG. 4 depicts an embedding space in which one or more embeddings are fine-tuned for a specified task. In some instances, it may be helpful to fine-tune or retrain the embedding of the semantic context for a specific task, for example a classifier for sports content, political content, hate speech, etc.

Because word embedding is often performed primarily on major languages, the accuracy with respect to lower resource languages may be compromised during the task-specific embedding process. During the initial training of a classifier, a loss function representing the distances between semantically related words is used. When the loss function is minimized, the optimal configuration for the embedding space is realized. The loss function may also be used as a regularization term when fine-tuning the universal word embedding for specific tasks.

An example of retraining is shown in FIG. 4. The English word "son" 102 was originally mapped to vector $V_1$ 108. However, based on a re-training process, vector $V_1$ has been updated to a new position in the word embedding space, shown as updated vector $V_{1u}$ 402, reflecting a re-calculated magnitude and direction for vector $V_1$ 108 based on the specific task for which the word embedding space is being trained.

To maintain the accuracy for lower resource languages, vectors to which words in lower resource languages are mapped which are close in distance to the updated vector $V_{1u}$ 402 should be updated by a similar change in direction and magnitude to maintain a similar distance to the updated vector $V_{1u}$ as before the update. This is shown in FIG. 4, where original vector $V_3$ 118 is pulled to a new position, shown as vector $V_{3u}$ 404. It should be noted that the distance and orientation of original vector $V_3$ 118 with respect to original vector $V_1$ 108 has been maintained for updated vector $V_{3u}$ 404 and updated vector $V_{1u}$ 402.

Exemplary Logic

Figure 5:
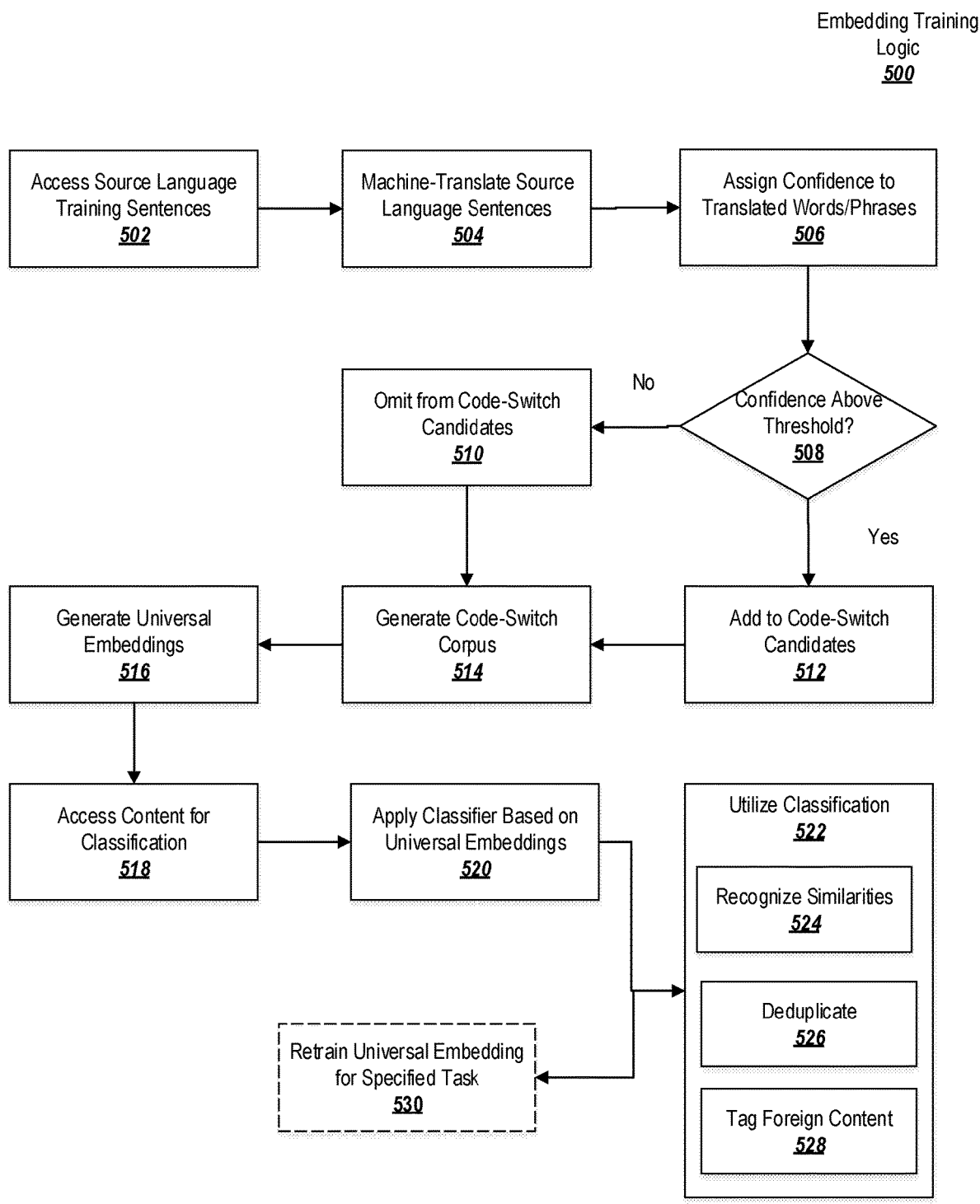
FIG. 5 is a flow chart depicting exemplary logic for performing a method according to exemplary embodiments.

FIG. 5 is a flow chart depicting exemplary logic for performing a method according to exemplary embodiments.

Boxes 502 through 514 represent the generation of the code-switched corpus 308 shown in FIG. 3. At 502, source language training sentences 302 are accessed and, at 504 the source language sentences 302 are machine translated on a word-by-word basis to provide target machine language machine translation 304. At 506, translation confidences 306 are assigned to each translation performed between source language sentence 302 and target machine language translation 304. At 508, is it is determined, for each word translated between source language sentence 302 and target machine language translation 304, if the translation confidence 306 is above a predetermined threshold. If the translation confidence 306 is above the predetermined threshold, the word is added to the code-switch candidates at 512. If the translation confidence 306 is not above the predetermined threshold, the word is omitted from the code-switch candidates at 510. At 514, the code-switched corpus 308 is generated using the translation of all words having a translation confidence 306 above the predetermined threshold.

At 516 universal embeddings (i.e. vectors) are generated for words in the code-switching corpus 308. This step also involves training a classifier on the universal embeddings to generate an embedding mapping/table. At 518, new content is accessed for classification. The new content may be written in a language for which a specific classifier may not exist. The new content may be, for example, a post on a social media site, an email message, an SMS message, text derived from the output of an automatic speech recognition module, or any other form of text. The new content may be in any language.

At 520, the classifier is applied without needing to be trained on the particular language of the new content to generate mappings for words in the new content to vectors in the word embedding space. The classification can be used for various tasks at 522 including to recognize similarities in two different content items at 524, to perform to de-duplication at 526 and to perform topic tagging for stories in foreign languages at 528. At 530 the word embedding space may be retrained to perform for a specific task of type of task as described with respect to FIG. 4.

Network Embodiments

Figure 6:
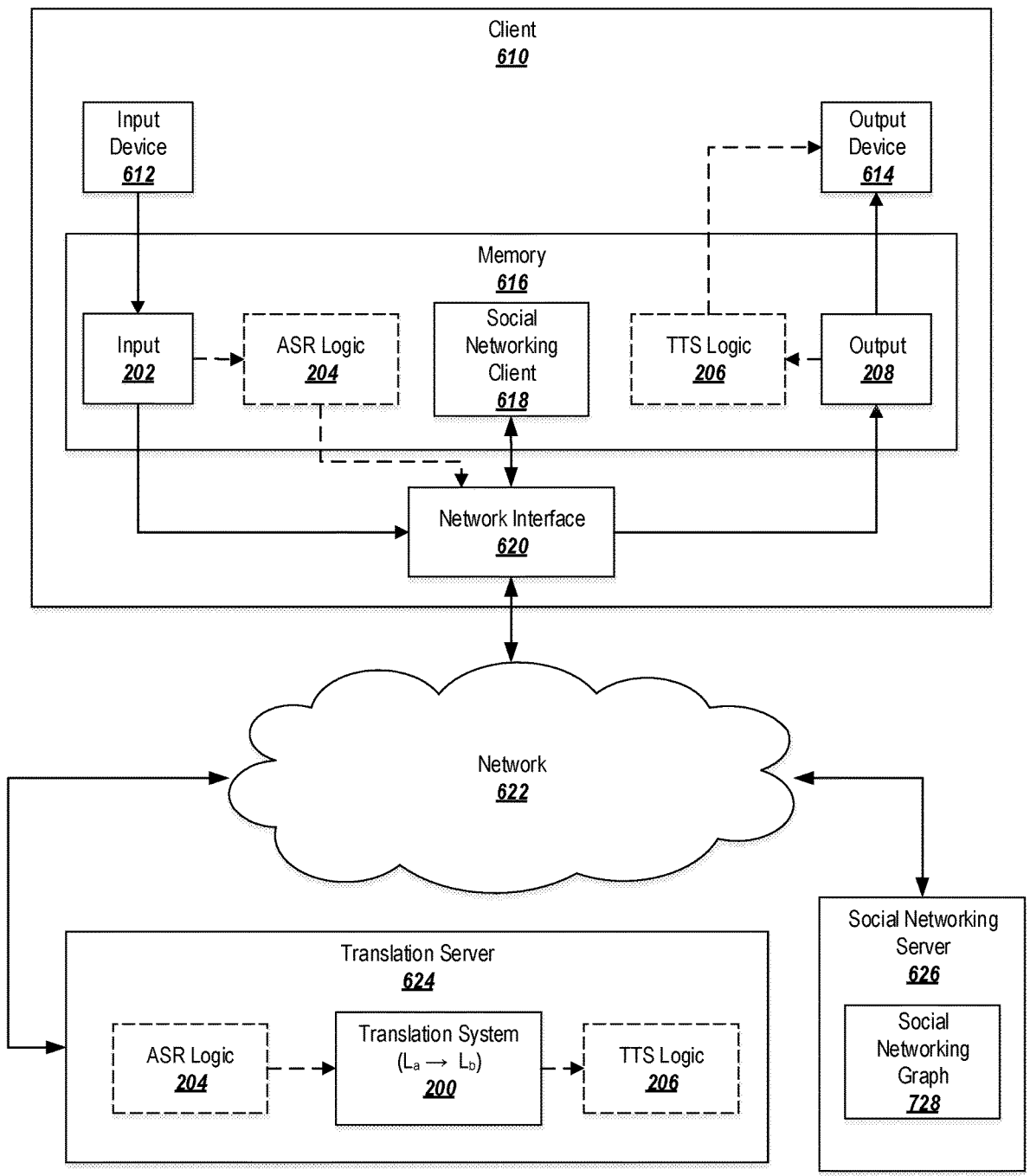
FIG. 6 depicts an exemplary network embodiment.

Some exemplary embodiments may be employed in a network environment, such as the environment depicted in FIG. 6.

A user may interact with a client 610, which may be (for example) a personal computer, tablet, mobile phone, special-purpose translation device, etc. In some embodiments, the client 610 does not require interaction from a user.

The client 610 may include one or more input devices 612 and one or more output devices 614. The input devices 612 may include, for example, microphones, keyboards, cameras, electronic pens, touch screens, and other devices for receiving an input in a source language $L_a$. The output devices 614 may include a speaker, a display device such as a monitor or touch screen, and other devices for presenting an output in a destination language $L_b$.

In some embodiments, the input from the input devices 612 may be in the form of an input 202 that is being sent to a translation system 200 for translation. In other embodiments, the client 610 may also submit training data, a phrase table, a translation, or a translation and the original source data used to generate the translation.

The client 610 may include a memory 616, which may be a non-transitory computer readable storage medium, such as one or a combination of a hard drive, solid state drive, flash storage, read only memory, or random access memory. The memory 616 may a representation of an input 202 and/or a representation of an output 208, as well as one or more applications. For example, the memory 616 may store a social networking client 618 that allows a user to interact with a social networking service.

The input 202 may be textual, such as in the case where the input device 612 is a keyboard. Alternatively, the input 202 may be an audio recording, such as in the case where the input device 612 is a microphone. Accordingly, the input 202 may be subjected to automatic speech recognition (ASR) logic 204 to transform the audio recording to text that is processable by the translation system 200. As shown in FIG. 6, the ASR logic 204 may be located at the client device 610 (so that the audio recording is processed locally by the client 610 and corresponding text is transmitted to the translation server 624), or may be located remotely at the translation server 624 (in which case, the audio recording may be transmitted to the translation server 624 and the translation server 624 may process the audio into text). Other combinations are also possible—for example, if the input device 612 is a touch pad or electronic pen, the input 202 may be in the form of handwriting, which may be subjected to handwriting or optical character recognition analysis logic to transform the input 202 into processable text.

Similarly, a resulting output 208 from a translation system 200 may be in the form of text. In some embodiments, the desirable end form of the output may be something other than text, such as an audio representation of the translation. Accordingly, the output 208 may be subjected to text-to-speech (TTS) logic 206 to transform the text into an audio recording that is presentable by the output devices 614. As shown in FIG. 6, the TTS logic 206 may be located at the client device 610 (so that the output text is processed locally by the client 610 and corresponding audio is sent to the output devices 614), or may be located remotely at the translation server 624 (in which case, text may be processed at the translation server 624 and the resulting audio recording may be transmitted to the client 610). Other combinations of processing logic are also possible, depending on the desired final form for the output 208.

The client 610 may be provided with a network interface 620 for communicating with a network 622, such as the Internet. The network interface 620 may transmit the input 202 in a format and/or using a protocol compatible with the network 622 and may receive a corresponding output 208 from the network 622.

The network interface 620 may communicate through the network 622 to a translation server 624. The translation server 624 may host the above-described translation system 200. The translation system 200 may translate the input 202 into an output 208.

The network interface 620 of the client 610 may also be used to communicate through the network 622 with a social networking server 626. The social networking server 626 may include or may interact with a social networking graph 628 that defines connections in a social network. Furthermore, the translation server 624 may connect to the social networking server 626 for various purposes, such as retrieving training data from the social network.

A user of the client 610 may be an individual (human user), an entity (e.g., an enterprise, business, or third-party application), or a group (e.g., of individuals or entities) that interacts or communicates with or over the social-networking server 626. The social-networking server 626 may be a network-addressable computing system hosting an online social network. The social-networking server 626 may generate, store, receive, and send social-networking data, such as, for example, user-profile data, concept-profile data, social-graph information, or other suitable data related to the online social network. The social-networking server 626 may be accessed by the other components of the network environment either directly or via the network 622.

The social-networking server 626 may include an authorization server (or other suitable component(s)) that allows users to opt in to or opt out of having their actions logged by social-networking server 626 or shared with other systems (e.g., third-party systems, such as the translation server 624), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 626 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by a social-networking system or shared with other systems (e.g., a third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 626 may send a request to the data store for the object. The request may identify the user associated with the request. The requested data object may only be sent to the user (or a client system 610 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 626 or explicit connections of a user to a node, object, entity, brand, or page on social-networking server 626. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for a Soda Company?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
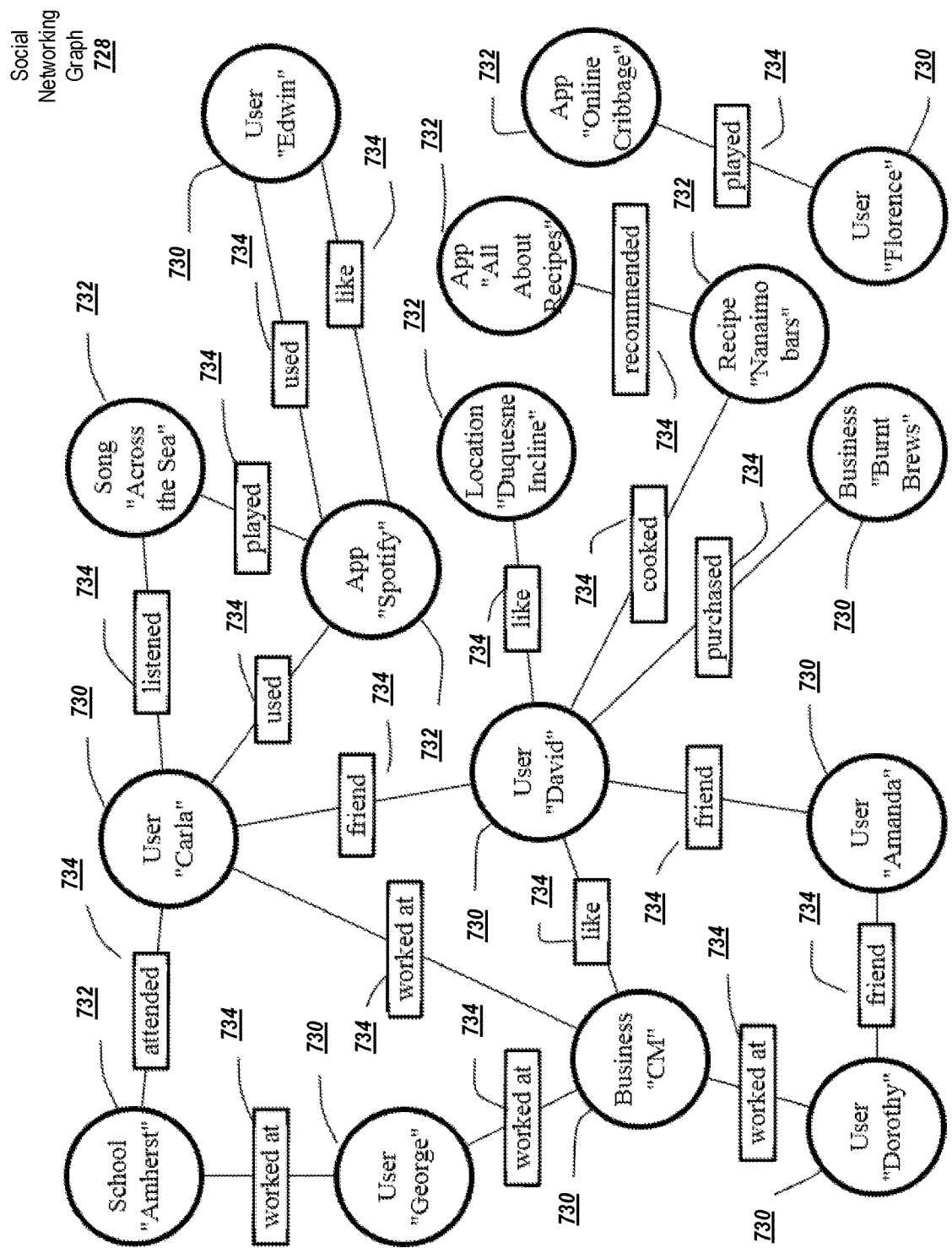
FIG. 7 describes the social networking graph depicted in FIG. 6 in more detail.

FIG. 7 illustrates an example of a social graph 728. In exemplary embodiments, a social-networking service may store one or more social graphs 728 in one or more data stores as a social graph data structure via the social networking service.

The social graph 728 may include multiple nodes, such as user nodes 730 and concept nodes 732. The social graph 728 may furthermore include edges 734 connecting the nodes. The nodes and edges of social graph 728 may be stored as data objects, for example, in a data store (such as a social-graph database). Such a data store may include one or more searchable or queryable indexes of nodes or edges of social graph 728.

The social graph 728 may be accessed by a social-networking server 726, client system 710, third-party system (e.g., the translation server 724), or any other approved system or device for suitable applications.

A user node 730 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 730 corresponding to the user, and store the user node 730 in one or more data stores. Users and user nodes 730 described herein may, where appropriate, refer to registered users and user nodes 730 associated with registered users. In addition, or as an alternative, users and user nodes 730 described herein may, where appropriate, refer to users that have not registered with the social-networking system. In particular embodiments, a user node 730 may be associated with information provided by a user or information gathered by various systems, including the social-networking system. As an example, and not by way of limitation, a user may provide their name, profile picture, contact information, birth date, sex, marital status, family status, employment, education background, preferences, interests, or other demographic information. In particular embodiments, a user node 730 may be associated with one or more data objects corresponding to information associated with a user. In particular embodiments, a user node 730 may correspond to one or more webpages. A user node 730 may be associated with a unique user identifier for the user in the social-networking system.

In particular embodiments, a concept node 732 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 732 may be associated with information of a concept provided by a user or information gathered by various systems, including the social-networking system. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 732 may be associated with one or more data objects corresponding to information associated with concept node 732. In particular embodiments, a concept node 732 may correspond to one or more webpages.

In particular embodiments, a node in social graph 728 may represent or be represented by a webpage (which may be referred to as a "profile page"). Profile pages may be hosted by or accessible to the social-networking system. Profile pages may also be hosted on third-party websites associated with a third-party server. As an example, and not by way of limitation, a profile page corresponding to a particular external webpage may be the particular external webpage and the profile page may correspond to a particular concept node 732. Profile pages may be viewable by all or a selected subset of other users. As an example, and not by way of limitation, a user node 730 may have a corresponding user-profile page in which the corresponding user may add content, make declarations, or otherwise express himself or herself. A business page may comprise a user-profile page for a commerce entity. As another example and not by way of limitation, a concept node 732 may have a corresponding concept-profile page in which one or more users may add content, make declarations, or express themselves, particularly in relation to the concept corresponding to concept node 732.

In particular embodiments, a concept node 732 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 730 corresponding to the user and a concept node 732 corresponding to the third-party webpage or resource and store edge 734 in one or more data stores.

In particular embodiments, a pair of nodes in social graph 728 may be connected to each other by one or more edges 734. An edge 734 connecting a pair of nodes may represent a relationship between the pair of nodes. In particular embodiments, an edge 734 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 734 connecting the first user's user node 230 to the second user's user node 730 in social graph 728 and store edge 734 as social-graph information in one or more data stores. In the example of FIG. 7, social graph 728 includes an edge 734 indicating a friend relation between user nodes 730 of user "Amanda" and user "Dorothy." Although this disclosure describes or illustrates particular edges 734 with particular attributes connecting particular user nodes 730, this disclosure contemplates any suitable edges 734 with any suitable attributes connecting user nodes 730. As an example, and not by way of limitation, an edge 734 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 728 by one or more edges 734.

In particular embodiments, an edge 734 between a user node 730 and a concept node 732 may represent a particular action or activity performed by a user associated with user node 730 toward a concept associated with a concept node 732. As an example, and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 732 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social-networking system may create a "listened" edge 734 and a "used" edge (as illustrated in FIG. 7) between user nodes 230 corresponding to the user and concept nodes 732 corresponding to the song and application to indicate that the user listened to the song and used the application. Moreover, the social-networking system may create a "played" edge 734 (as illustrated in FIG. 7) between concept nodes 732 corresponding to the song and the application to indicate that the particular song was played by the particular application. In this case, "played" edge 734 corresponds to an action performed by an external application (Music Service) on an external audio file (the song "Across the Sea"). Although this disclosure describes particular edges 734 with particular attributes connecting user nodes 730 and concept nodes 732, this disclosure contemplates any suitable edges 734 with any suitable attributes connecting user nodes 730 and concept nodes 732. Moreover, although this disclosure describes edges between a user node 730 and a concept node 732 representing a single relationship, this disclosure contemplates edges between a user node 730 and a concept node 732 representing one or more relationships. As an example, and not by way of limitation, an edge 734 may represent both that a user likes and has used at a particular concept. Alternatively, another edge 734 may represent each type of relationship (or multiples of a single relationship) between a user node 730 and a concept node 732 (as illustrated in FIG. 7 between user node 730 for user "Edwin" and concept node 732 for "Music Service").

In particular embodiments, the social-networking system may create an edge 734 between a user node 730 and a concept node 732 in social graph 728. As an example, and not by way of limitation, a user viewing a concept-profile page (such as, for example, by using a web browser or a special-purpose application hosted by the user's client system) may indicate that he or she likes the concept represented by the concept node 732 by clicking or selecting a "Like" icon, which may cause the user's client system to send to the social-networking system a message indicating the user's liking of the concept associated with the concept-profile page. In response to the message, the social-networking system may create an edge 734 between user node 730 associated with the user and concept node 732, as illustrated by "like" edge 734 between the user and concept node 732. In particular embodiments, the social-networking system may store an edge 734 in one or more data stores. In particular embodiments, an edge 734 may be automatically formed by the social-networking system in response to a particular user action. As an example, and not by way of limitation, if a first user uploads a picture, watches a movie, or listens to a song, an edge 734 may be formed between user node 730 corresponding to the first user and concept nodes 732 corresponding to those concepts. Although this disclosure describes forming particular edges 734 in particular manners, this disclosure contemplates forming any suitable edges 734 in any suitable manner.

The social graph 728 may further comprise a plurality of product nodes. Product nodes may represent particular products that may be associated with a particular business. A business may provide a product catalog to a consumer-to-business service and the consumer-to-business service may therefore represent each of the products within the product in the social graph 728 with each product being in a distinct product node. A product node may comprise information relating to the product, such as pricing information, descriptive information, manufacturer information, availability information, and other relevant information. For example, each of the items on a menu for a restaurant may be represented within the social graph 728 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 728. The information for a product node may be manipulated by the social-networking system as a product object that encapsulates information regarding the referenced product.

As such, the social graph 728 may be used to infer shared interests, shared experiences, or other shared or common attributes of two or more users of a social-networking system. For instance, two or more users each having an edge to a common business, product, media item, institution, or other entity represented in the social graph 728 may indicate a shared relationship with that entity, which may be used to suggest customization of a use of a social-networking system, including a messaging system, for one or more users.

Computer-Related Embodiments

Figure 8:
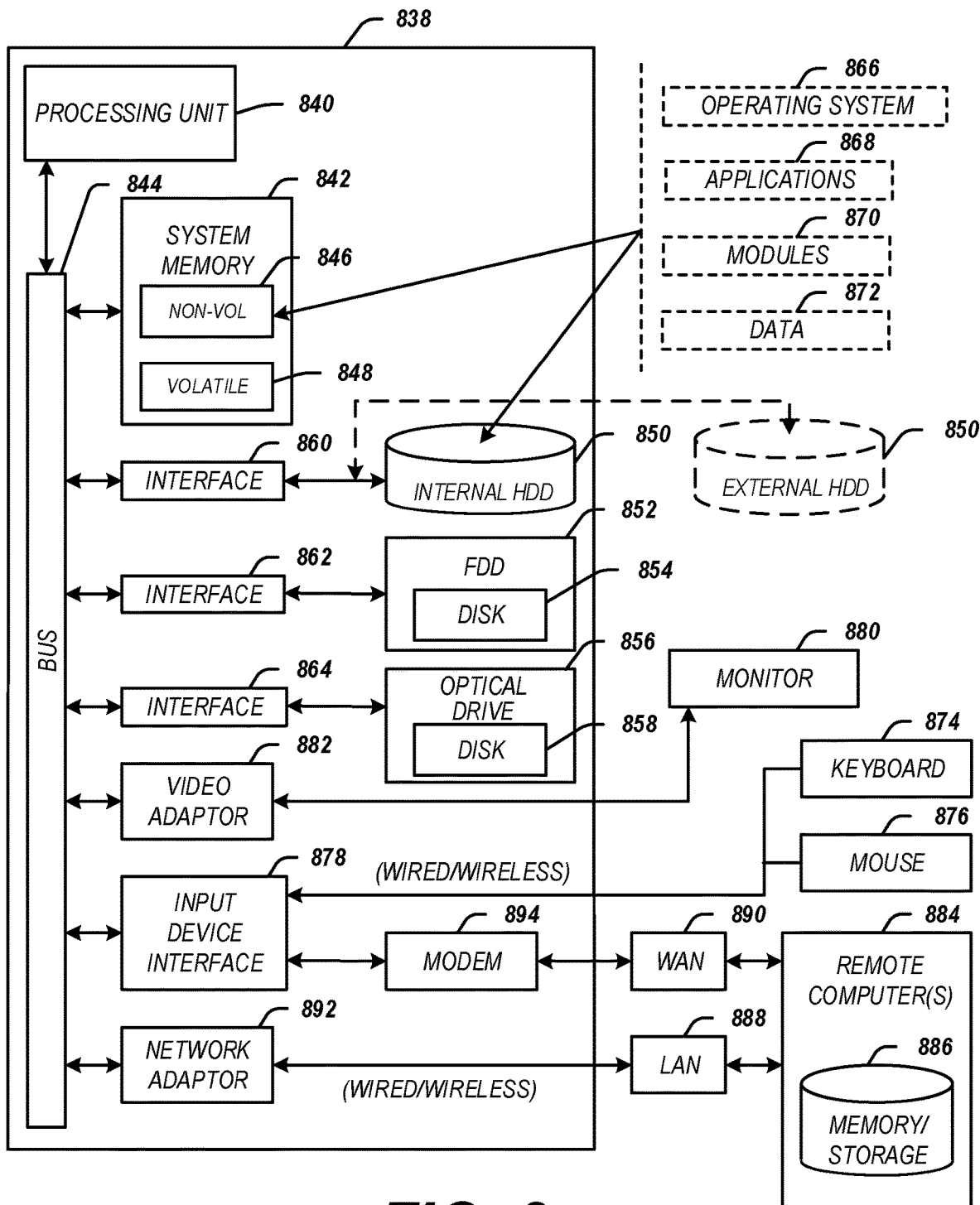
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 836 suitable for implementing various embodiments as previously described. In one embodiment, the computing architecture 836 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 836. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 836 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 836.

As shown in FIG. 8, the computing architecture 836 comprises a processing unit 840, a system memory 842 and a system bus 844. The processing unit 840 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 840.

The system bus 844 provides an interface for system components including, but not limited to, the system memory 842 to the processing unit 840. The system bus 844 can be any of several types of bus structure that may further interconnect to a memory bus (with or without a memory controller), a peripheral bus, and a local bus using any of a variety of commercially available bus architectures. Interface adapters may connect to the system bus 844 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 836 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 842 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 842 can include non-volatile memory 846 and/or volatile memory 848. A basic input/output system (BIOS) can be stored in the non-volatile memory 846.

The computer 838 may include various types of computer-readable storage media in the form of one or more lower speed memory units, including an internal (or external) hard disk drive (HDD) 850, a magnetic floppy disk drive (FDD) 852 to read from or write to a removable magnetic disk 854, and an optical disk drive 856 to read from or write to a removable optical disk 858 (e.g., a CD-ROM or DVD). The HDD 850, FDD 852 and optical disk drive 856 can be connected to the system bus 844 by a HDD interface 860, an FDD interface 862 and an optical drive interface 864, respectively. The HDD interface 860 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 846, 848, including an operating system 866, one or more application programs 868, other program modules 870, and program data 872. In one embodiment, the one or more application programs 868, other program modules 870, and program data 872 can include, for example, the various applications and/or components of the system.

A user can enter commands and information into the computer 838 through one or more wire/wireless input devices, for example, a keyboard 874 and a pointing device, such as a mouse 876. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 840 through an input device interface 878 that is coupled to the system bus 844, but can be connected by other interfaces such as a parallel port, IEEE 694 serial port, a game port, a USB port, an IR interface, and so forth.

A monitor 880 or other type of display device is also connected to the system bus 844 via an interface, such as a video adaptor 882. The monitor 880 may be internal or external to the computer 838. In addition to the monitor 880, a computer typically includes other peripheral output devices, such as speakers, printers, and so forth.

The computer 838 may operate in a networked environment using logical connections via wire and/or wireless communications to one or more remote computers, such as a remote computer 884. The remote computer 884 can be a workstation, a server computer, a router, a personal computer, portable computer, microprocessor-based entertainment appliance, a peer device or other common network node, and typically includes many or all of the elements described relative to the computer 838, although, for purposes of brevity, only a memory/storage device 886 is illustrated. The logical connections depicted include wire/wireless connectivity to a local area network (LAN) 888 and/or larger networks, for example, a wide area network (WAN) 890. Such LAN and WAN networking environments are commonplace in offices and companies, and facilitate enterprise-wide computer networks, such as intranets, all of which may connect to a global communications network, for example, the Internet.

When used in a LAN networking environment, the computer 838 is connected to the LAN 888 through a wire and/or wireless communication network interface or adaptor 892. The adaptor 892 can facilitate wire and/or wireless communications to the LAN 888, which may also include a wireless access point disposed thereon for communicating with the wireless functionality of the adaptor 892.

When used in a WAN networking environment, the computer 838 can include a modem 894, or is connected to a communications server on the WAN 890, or has other means for establishing communications over the WAN 890, such as by way of the Internet. The modem 894, which can be internal or external and a wire and/or wireless device, connects to the system bus 844 via the input device interface 878. In a networked environment, program modules depicted relative to the computer 838, or portions thereof, can be stored in the remote memory/storage device 886. It will be appreciated that the network connections shown are exemplary and other means of establishing a communications link between the computers can be used.

The computer 838 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
 accessing a code-switching corpus, wherein the code-switching corpus is built by machine-translating select words from a first language to a second language, the select words comprising words translatable with a confidence above a predetermined threshold;
 generating a universal embedding for words in the code-switching corpus, the universal embedding mapping the words in the code-switching corpus to a corresponding language-agnostic semantic meaning of the words;
 accessing content to be classified; and
 classifying the content based on the universal embedding.

2. The method of claim 1, wherein the universal embedding is a vector in an embedding space that uniquely a semantic meaning within the embedding space.

3. The method of claim 1, further comprising applying the universal embedding to recognize similarities in two content items.

4. The method of claim 1, further comprising applying the universal embedding to perform deduplication.

5. The method of claim 1, further comprising applying the universal embedding to tag content in a target foreign language with a topic based on a corresponding tag applied to content in a source language.

6. The method of claim 1, wherein the universal embedding is generating using a loss function, and further comprising refining the universal embedding for an identified task by using the loss function as a regularization term when tuning the universal embedding.

7. A non-transitory computer-readable medium storing instructions that, when executed by one or more processors, cause the one or more processors to:
 access a code-switching corpus, wherein the code-switching corpus is built by machine-translating select words from a first language to a second language, the select words comprising words translatable with a confidence above a predetermined threshold;
 generate a universal embedding for words in the code-switching corpus, the universal embedding mapping the words in the code-switching corpus to a corresponding language-agnostic semantic meaning of the words;
 access content to be classified; and
 classify the content based on the universal embedding.

8. The medium of claim 7, wherein the universal embedding is a vector in an embedding space that uniquely a semantic meaning within the embedding space.

9. The medium of claim 7, further storing instructions for applying the universal embedding to recognize similarities in two content items.

10. The medium of claim 7, further storing instructions for applying the universal embedding to perform deduplication.

11. The medium of claim 7, further storing instructions for applying the universal embedding to tag content in a target foreign language with a topic based on a corresponding tag applied to content in a source language.

12. The medium of claim 7, wherein the universal embedding is generating using a loss function, and further storing instructions for refining the universal embedding for an identified task by using the loss function as a regularization term when tuning the universal embedding.

13. An apparatus comprising:
 a non-transitory computer-readable medium configured to store a code-switching corpus, wherein the code-switching corpus is built by machine-translating select words from a first language to a second language, the select words comprising words translatable with a confidence above a predetermined threshold;
 a hardware processor circuit;
 embedding logic executable on the processor circuit to generate a universal embedding for words in the code-switching corpus, the universal embedding mapping the words in the code-switching corpus to a corresponding language-agnostic semantic meaning of the words;
 a classifier configured to access content to be classified and classify the content based on the universal embedding.

14. The apparatus of claim 13, wherein the universal embedding is a vector in an embedding space that uniquely a semantic meaning within the embedding space.

15. The apparatus of claim 13, further comprising similarity logic for applying the universal embedding to recognize similarities in two content items.

16. The apparatus of claim 13, further comprising deduplication logic for applying the universal embedding to perform deduplication.

17. The apparatus of claim 13, further comprising tagging logic for applying the universal embedding to tag content in a target foreign language with a topic based on a corresponding tag applied to content in a source language.

* * * * *